Jan. 7, 1969     E. WALDEN     3,420,073

SHAFT COUPLINGS

Filed Aug. 15, 1966

United States Patent Office 3,420,073
Patented Jan. 7, 1969

3,420,073
SHAFT COUPLINGS
Eric Walden, 5 Provost Court, Eton Road,
London NW. 3, England
Filed Aug. 15, 1966, Ser. No. 572,445
Claims priority, application Great Britain, Aug. 20, 1965,
19,582/65
U.S. Cl. 64—18        13 Claims
Int. Cl. F16d 3/19

ABSTRACT OF THE DISCLOSURE

A universal coupling comprising a pair of connecting members adapted for mounting on the adjacent ends of shafts to be joined. The connecting members are each provided with a pair of diametrically opposed trunnions which are slidably mounted in four radial bores spaced 90° apart in an intermediate ring member. In order to position the trunnions in the bores the intermediate ring member is formed in two axially abutting parts which are detachably connected together. The radial bores are formed partly in each of the intermediate ring member parts and the intermediate ring member is made of a thermoplastic material so as to avoid the necessity of separate bearings or added lubrication.

---

This invention relates to shaft couplings of the Hookes type for connecting together two shafts end to end.

An object of the invention is to provide a Hookes type joint in which the central yoke member is replaced by an intermediate ring member having a construction which permits the easy and rapid assembly of the parts without the use of any special tools.

In particular the invention sets out to provide a coupling having a minimum number of components in which the construction of the intermediate ring member avoids the use of separately mounted trunnions or pivot pins.

In its broadest aspect the invention provides a universal coupling for joining two shafts end to end, said coupling comprising a pair of sleeves or like members adapted for mounting one on the end of each shaft, a pair of diametrically-opposed trunnions on each sleeve, and an intermediate ring member having four radial bores therein spaced 90° apart for receiving the trunnions, wherein the intermediate ring member is formed in two parts detachably connected to each other and each radial bore is formed partly in each of said intermediate ring member parts, whereby said trunnions can be positioned in said bores by separating the intermediate ring member parts.

In the preferred embodiment the trunnions of each sleeve extend radially from a pair of diametrically opposed lugs extending axially from the periphery of the sleeve, the sleeves being positioned in the intermediate member with the lugs spaced 90° apart. Preferably one of said intermediate ring member parts is formed with four axially extending grooves each having a rounded end portion forming a part of said radial bores for receiving said trunnions therein, while the other of said intermediate ring member parts comprises a ring axially engaging the end of said first part and having four axially extending projections thereon engaging the slots of said first part, said projections having rounded end portions for completing said radial bores when said parts are connected together to form the intermediate ring member.

In order to connect the parts of the intermediate ring member together said other intermediate ring member part is formed with axially extending claws engaging over said first intermediate ring member part. Conveniently said claws are located in axial grooves in the periphery of said first part and have end portions adapted to snap into a recess at the end of each of said grooves.

The construction permits the trunnions to be formed integrally with the sleeves thus avoiding the necessity of providing separate components.

Figures 1, 2:
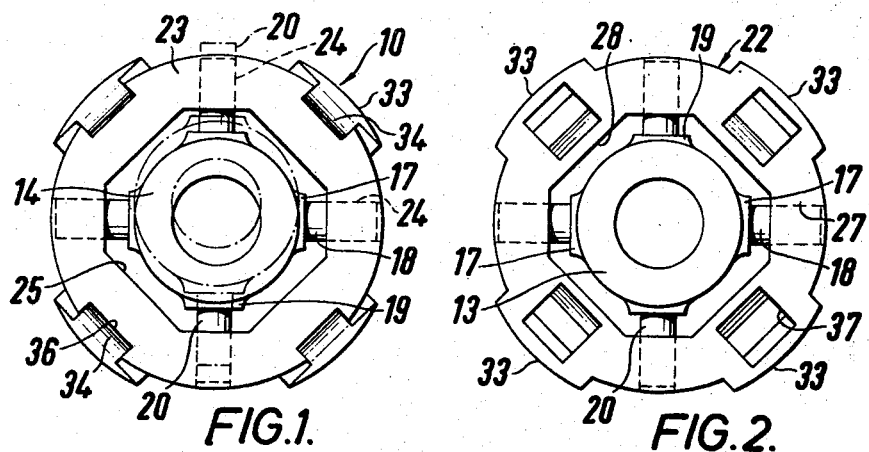
Figures 3, 4:
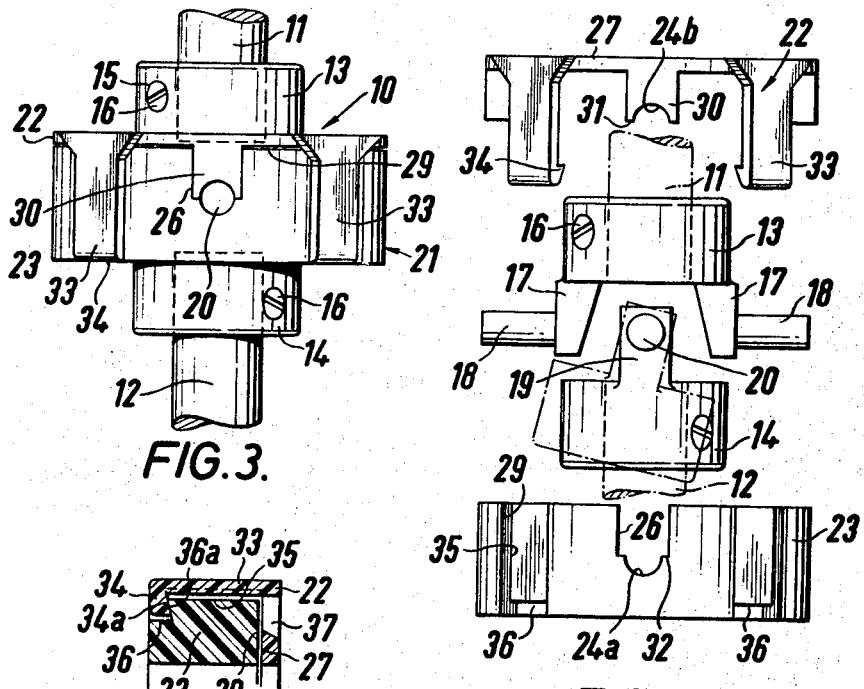
Figure 5:
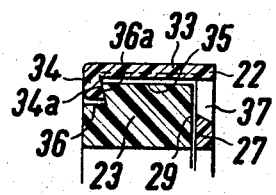

The invention will now be described by way of example with reference to the accompanying drawings in which:

FIGURE 1 is a view of one end of a coupling in accordance with the invention;
FIGURE 2 is a view of the other end of the coupling of FIGURE 1;
FIGURE 3 is a plan view of the coupling as shown in FIGURE 1;
FIGURE 4 is an exploded plan view of the coupling as shown in FIGURE 1; and
FIGURE 5 is a detail view on an enlarged scale showing the connection between the two parts of the central or intermediate ring member.

Referring to the drawings the embodiment shown comprises a universal coupling 10 of the Hookes type for joining together two shafts 11, 12 end to end so as to convey rotary motion from one shaft to the other.

The coupling comprises a sleeve 13 adapted to fit on the end of the shaft 11 and a sleeve 14 adapted to fit on the end of the shaft 12. The sleeves are provided with threaded radial bores 15 in which are located screws 16 for securing the sleeves to the corresponding shaft. The sleeves may of course be replaced by solid rods or like members connected internally or otherwise to shafts 11 and 12.

As shown more clearly in FIGURE 4, the sleeve 13 has two ears or lugs 17 formed integrally therewith. The lugs 17 are diametrically positioned and extend axially from the periphery of the sleeve. Each lug 17 supports a trunnion or pin 18, the trunnions extending radially outwardly in opposite directions.

The sleeve 14 is similarly formed with ears or lugs 19 provided with trunnions or pins 20. In the assembled condition of the coupling 10 as shown in FIGURE 3 the sleeves 13 and 14 are positioned so that their lugs 17 and 19 are spaced 90° apart (see FIGURE 1) with the trunnions 18 and 20 located in the same transverse plane (see FIGURE 4). In this assembled condition the ends of the lugs 17 or 19 are spaced from the adjacent surface of the other sleeve 14 or 13. This arrangement permits angular movement of the shafts 11 and 12 about their trunnions to accommodate any angular and lateral misalignment of the shafts. In FIGURE 4 the sleeve 14 is shown in chain lines to illustrate angular misalignment of shaft 12.

The intermediate ring member is shown by reference 21 and comprises two separable parts 22, 23 (see FIGURE 4), both of which are moulded in a thermoplastic plastic or similar material having a resilient nature as will be hereinafter explained. The trunnions 18 and 20 can be an interference fit in bores 24 in the intermediate ring member 21 and the invention is particularly concerned with the constructional features of this member which enables the assembly therein of the integral sleeve and trunnion members.

As previously mentioned the intermediate ring member 21 is formed in two separate parts and the part 23 forms a base part in which the trunnions 18 and 20 are first mounted. Part 23 has a central opening 25 in which sleeve 14 is located during the assembly of the coupling. The part 23 is formed with four slots 26, spaced 90° apart, and each having a rounded inner portion 24a which forms part of a bore 24. The trunnions 20 of sleeve 14 are positioned in a diametrically opposite pair of slots 26. The trunnions 18 of the sleeve 13 are similarly positioned in the other diametrically opposite pair of slots 26 with the sleeve 13 oppositely positioned to the sleeve 14. The trunnions 18 and 20 snugly fit in the inner portions 24a.

The part 22 of the intermediate ring member 21 provides a closure part in the form of a flat ring 27 (see FIGURE 2) having a central opening 28 in which sleeve 13 is located when the coupling is assembled. The ring 27 fits against the end face 29 of part 23 with a slight clearance for assembly purposes as shown in FIGURE 5 and it is formed with four projections 30, spaced 90° apart, and which fit snugly within the slots 26 of part 23. The ends of projections 30 are each rounded at 24b to mate with rounded inner portions 24a of slots 26 to form the bores 24 for the trunnions. The ends 31 of projections 30 seat on shoulders 32 in slots 26.

The parts 22 and 23 are held together by two or more claws 33 formed integrally with part 22. In the embodiment shown four claws 33 are provided, one intermediate each pair of projections 30. The claws are formed with ends 34 and during the assembly of parts 22 and 23 the claws slide along axial grooves 35 formed in the periphery of part 23 until the ends 34 snap into recesses 36 at the end of the grooves. The inner surface 34a of the ends 34 of the claws project rearwardly (i.e. towards ring 27) and the recesses 36 are similarly formed at 36a to provide adequate locking. The clearance between ring 27 and face 29 permits the engagement of ends 34 by temporary deformation of the ring. The resilience of the material of the claws 33 is such as to allow a temporary distortion and when the ends 34 are engaged in recesses 36 the elasticity inherent in the material returns the claws to their normal form thus providing a secure means of fixing the parts 22 and 23 together.

The use of a thermoplastic plastic also provides a bearing surface for the trunnions 18 and 20 possessing a low coefficient of friction which is not impaired by the absence of a lubricant. In addition, certain thermoplastic plastics possess a high degree of electrical insulation and the coupling could therefore act as an electrical insulator between the shafts 11 and 12.

Axial misalignment of the shafts 11 and 12 is permitted by spacing the lugs 17 and 19 of sleeves 13 and 14 from the inner surfaces of the parts 22 and 23 in the openings 25 and 28. In FIGURE 1 sleeve 14 is shown centrally located in opening 25 by the full lines, but is axially misaligned as shown in chain lines, this movement being permitted by the sliding movement of trunnions 20 in the bores 24. A similar movement of sleeve 13 by its trunnions 18 is also possible.

In order to dismantle the coupling the ends 34 of claws 33 are prised outwardly to allow the parts 22 and 23 to move apart. This movement can be assisted by pressing together surfaces 27 and 29 which are normally separated by the slight clearance. Slots 37 are for tooling purposes.

It will be appreciated that the invention provides a greater improved and simplified coupling which can be rapidly assembled without the use of special tools. Only a minimum number of components are used and in particular the use of separate connecting pins is avoided.

I claim:

1. A universal coupling for joining two shafts end to end, said coupling comprising a pair of connecting members adapted for mounting on one end of the respective shafts; a pair of diametrically opposed trunnions on each connecting member; and an intermediate ring member having four radial bores therein spaced 90° apart for receiving the trunnions; said intermediate ring member being formed in two parts detachably connected to each other, and each radial bore being formed partly in each of said intermediate ring member parts; said trunnions being positionable in said bores by separating the intermediate ring member parts; one of said intermediate ring member parts being formed with four axially extending grooves each having a rounded end portion forming a portion of said radial bores, and the other of said intermediate ring member parts comprising a ring axially engaging the end of said first intermediate ring member part and having four axially extending projections thereon engaging the grooves of said first intermediate ring member part; said projections having rounded end portions for completing said radial bores when said intermediate ring member parts are connected together; said other intermediate ring member part being formed with axially extending claws engaging over said first intermediate ring member part for connecting said parts together.

2. A coupling as claimed in claim 1, in which the trunnions of each connecting member extend radially from a pair of diametrically opposed lugs extending axially from the periphery of the connecting member, the latter being positioned in the intermediate member with the lugs spaced 90° apart.

3. A coupling as claimed in claim 1, wherein said claws are located in axial grooves in the periphery of said first part and have end portions adapted to snap into a recess at the end of each of said grooves.

4. A coupling as claimed in claim 1, in which the trunnions are formed integrally with said connecting members.

5. A coupling as claimed in claim 1, in which the trunnions are mounted for endwise movement in said radial bores.

6. A universal coupling for joining two shafts end to end, said coupling comprising a pair of connecting members adapted for mounting on one end of the respective shafts; a pair of diametrically opposed trunnions on each connecting member; and an intermediate ring member having four radial bores therein spaced 90° apart for receiving the trunnions; said intermediate ring member being formed in two parts detachably connected to each other, and each radial bore being formed partly in each of said intermediate ring member parts; said trunnions being positionable in said bores by separating the intermediate ring member parts; one of said intermediate ring member parts being formed with four axially extending grooves each having a rounded end portion forming a portion of said radial bores, and the other of said intermediate ring member parts comprising a ring axially engaging the end of said first intermediate ring member part and having four axially extending projections thereon engaging the grooves of said first intermediate ring member part; said projections having rounded end portions for completing said radial bores when said intermediate ring member parts are connected together.

7. A coupling as claimed in claim 6, wherein said connecting members each comprise a sleeve having a pair of diametrically opposed lugs extending axially from the periphery thereof, the sleeves being positioned in the intermediate member with said lugs spaced 90° apart, each trunnion of each sleeve extending radially from a corresponding lug.

8. A coupling as claimed in claim 6, wherein said claws are located in axial grooves in the periphery of said first intermediate ring member part and have end portions adapted to snap into a recess at the end of each of said grooves.

9. A coupling as claimed in claim 6, in which the trunnions are formed integrally with said sleeves.

10. A coupling as claimed in claim 6, in which the trunnions are mounted for axial movement in said radial bores.

11. A universal coupling for joining two shafts end to end, said coupling comprising a pair of connecting members adapted for mounting on one end of the respective shafts; a pair of diametrically opposed trunnions on each connecting member; and an intermediate ring member of thermoplastic material having four radial bores therein spaced 90° apart, said intermediate ring member being formed by two axially abutting parts detachably connected one to the other and each forming a portion of each of said radial bores; said trunnions being mounted in said radial bores for rotatable and axial movement with said thermoplastic material providing a bearing surface, one of said intermediate ring member parts being formed with four axially extending slots each having a rounded inner end portion forming a portion of said radial bores, the other of said intermediate ring member parts comprising a ring axially abutting the end of said first intermediate ring member part and having four axially extending projections thereon engaging the slots of said first intermediate ring member part, said projections having recessed end portions for completing said radial bores when said intermediate member parts are connected together.

12. A coupling as claimed in claim 11, wherein said other intermediate ring member part is formed with axially extending claws engaging over said first intermediate ring member part for connecting said intermediate ring member parts together.

13. A coupling as claimed in claim 12, wherein said claws are located in axial grooves in the periphery of said first intermediate ring member part and have end portions adapted to snap into a recess at the end of each of said grooves.

References Cited

UNITED STATES PATENTS

| 1,250,349 | 12/1917 | Perkins | 64—18 |
| 1,278,218 | 9/1918 | Rhodes | 64—18 |
| 1,643,647 | 9/1927 | Tarbox | 64—18 |
| 1,868,282 | 7/1932 | Feightner | 64—18 |
| 1,913,783 | 6/1933 | Williams | 64—18 |
| 2,491,364 | 12/1949 | Earl | 64—31 X |

FOREIGN PATENTS 864,993   4/1961   Great Britain.

HALL C. COE, *Primary Examiner.*

U.S. Cl. X.R.

64—31